(12) United States Patent
Wang et al.

(10) Patent No.: US 7,087,283 B2
(45) Date of Patent: Aug. 8, 2006

(54) OPTICAL STORAGE MEDIA AND FABRICATION METHOD THEREOF

(75) Inventors: Shin-Shin Wang, Hsinchu (TW);
Wen-Ping Chu, Jhonghe (TW);
Hsin-Hong Yao, Taichung (TW);
Hui-Ping Tsai, Hsinchu (TW);
Ming-Chia Lee, Taichung Hsien (TW);
Wen-Yih Liao, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 225 days.

(21) Appl. No.: 10/863,867

(22) Filed: Jun. 8, 2004

(65) Prior Publication Data

US 2005/0142323 A1    Jun. 30, 2005

(30) Foreign Application Priority Data

Dec. 31, 2003  (TW) .............................. 92137648 A

(51) Int. Cl.
*B32B 3/02* (2006.01)
(52) U.S. Cl. ................... 428/64.1; 428/64.4; 428/64.8; 430/270.14
(58) Field of Classification Search ............... 428/64.8; 430/270.14
See application file for complete search history.

(56) References Cited

U.S. PATENT DOCUMENTS 6,071,671 A    6/2000  Glushko et al. ....... 430/270.15

FOREIGN PATENT DOCUMENTS

| WO | WO 00/48197 | | 8/2000 |
|----|-------------|---|--------|
| WO | WO 01/06505 | A1 | 1/2001 |
| WO | WO 01/37266 | A1 | 5/2001 |

*Primary Examiner*—Elizabeth Mulvaney
(74) *Attorney, Agent, or Firm*—Thomas, Kayden, Horstemeyer & Risley

(57) ABSTRACT

An optical storage medium having a three-dimensional data pattern, and fabrication method thereof. The optical storage medium includes a substrate and a plurality of recording layers, each constituting a fluorescent oligomer. Due to the high quantum yield and high stock shift of the fluorescent oligomer, the recording layers emit intensive fluorescent signals when the optical storage medium is illuminated with reading beams. Accordingly, the recording sensitivity and the readout characteristics of optical storage mediums are improved without additional signal-amplifying structures or materials.

28 Claims, 2 Drawing Sheets

OPTICAL STORAGE MEDIA AND FABRICATION METHOD THEREOF

BACKGROUND OF THE INVENTION

1. Field of the Invention

The invention relates to optical storage media and fabrication method thereof. More particularly, the present invention relates to optical storage media having three-dimensional data pattern and fabrication method thereof.

2. Description of the Related Art

In optical storage media, digital information is usually written as local variations in thickness, refractive index or absorption coefficient. Optical storage media are more convenient than magnetic, because of less restriction of parallel writing or reading of information, and are usually formed as optical discs suitable for read-only or recordable operations.

However, since conventional optical storage media store data in a two-dimensional data pattern, ultimate pixel capacity thereof is restricted by the light diffraction limit. Although quadrupled capacity can be achieved by a measure of super resolution at fractions of wavelength to store 3–5 bits in a single pit, implementation of this measure demands very precise and sophisticated optical, mechanical and electronic equipment in a high quality medium, which obviously makes this approach expensive and less feasible.

To obtain larger capacity of optical storage media, three-dimensional (3D) data pattern (volume holographic storage), further utilizing a depth direction, has been disclosed. It is obvious that 3D recording can dramatically increase the storage capacity of the device. There are known 3D recording methods, based, for example, on 3D volume storage by virtue of local changes in the refractive index of optical media. It has been proposed that by writing and reading data in a 3D format, data storage densities greater that 1012 bits cm$^3$ can be achieved.

Recording methods are based on 3D volume storage utilizing local changes in refractive index of optical media. These local variations in refractive index result in birefringence and variations in polarization of the reading beam transmitted through the media. The variations are detectable and can be interpreted as binary code.

However, due to the diffraction and power loss caused by the multiple layers, the fluorescent signal therefrom weak enough that high power lasers and highly sensitive detectors are required for detection thereof.

To overcome the drawbacks described, a 3D optical storage medium with a signal-amplifying structure has been disclosed. FIG. 1 is a cross section of the structure of a 3D optical storage medium. The 3D optical storage medium 10 comprises two data layers 20 and an isolation layer 40. Each data layer 20, located between an upper electrode 30 and a lower electrode 32, comprises a plurality of pits 22 filled by an active layer 24. The adjacent upper and lower electrodes are separated by the isolation layer 40. Moreover, the 3D optical storage medium 10 further comprises a signal-amplifying structure 80, comprising a upper electrode 34, a photoconductive layer 60, an electroluminescent layer 70, and a lower electrode 36, bonded in that order.

A voltage is applied to signal-amplifying structure 80 through the electrodes 34 and 36. When the data layer 20 is read by laser beams, the data layer 20 emits a weak excitation light into the photoconductive layer 60 inducing a photocurrent therein. The photocurrent leads to a redistribution of the voltage between the photoconductive layer 60 and the electroluminescent layer 70, thereby causing a reliable electroluminescence signal. Hence, the 3D optical storage medium 10 can efficiently amplify signal strength through the signal-amplifying structure 80.

However, due to the additional formation of signal-amplifying structure 80, the 3D optical storage medium 10 has a high cost and is difficult to fabricate. Furthermore, since an input voltage must be applied to the 3D optical storage medium 10 to implement the signal-amplifying structure 80. Compatibility between the 3D optical storage medium 10 and the usual optical media drive can thus be a problem, causing inconvenience and difficulty.

A 3D optical storage medium employing a small molecular fluorescent material has also been disclosed to simplify the structure and fabrication process thereof. Referring to FIG. 2, the 3D optical storage medium 100 comprises a substrate 110, a plurality of information layers 120, and a plurality of adhesive layers 130, wherein each information layer 120 has a plurality of pits filled with a small molecular fluorescent material, such as nile blue, rhodamine, cyanine, acridine, and phenoxazone. Due to the considerably lower quantum yield of small molecular fluorescent materials, a photoconductive material is further doped into the small molecular fluorescent material to enhance the signal strength, thereby increasing the process complexity of 3D optical storage media. Furthermore, the mentioned small molecular fluorescent material described exhibits an absorption wavelength of 580 to 650 nm with the stock shift (difference between the absorbed wavelength and the emitted wavelength) thereof less than 30 nm, resulting in crosstalk and a decrease in the signal-to-noise (S/N) ratio. Moreover, since the small molecular fluorescent material has to be dispersed in a polymer material to avoid concentration quenching effect, the cost and process complexity of 3D optical storage media are increased.

Therefore, in order to meet the demands of the market, it is necessary to develop a 3D optical storage medium with a simple manufacturing process and structure to provide improved the recording sensitivity thereof.

SUMMARY OF THE INVENTION

Accordingly, an object of the present invention is to provide optical storage media. The optical storage medium according to the present invention comprises a substrate and a plurality of recording layers, wherein the recording layer comprises a fluorescent oligomer. Due to the high quantum yield and high stock shift of the fluorescent oligomer, the recording layers emit intensive fluorescent signals when the optical storage medium is illuminated with reading beams. Thus, the recording sensitivity, readout characteristics, and storage capacity of the optical storage media can be improved without additional signal-amplifying structures or materials, resulting in simple fabrication process and lower cost.

Another object of the present invention is to provide a method for fabricating optical storage media, simplifying the fabrication processes thereof.

The optical storage medium according to the present invention comprises a substrate and a plurality of recording layers.

To achieve these objects, the optical storage medium according to the present invention comprises a substrate and a plurality of recording layers formed thereon, wherein the recording layer comprises a fluorescent oligomer having a structure shown by formula (I):

$$\text{-(Z-X)}_{\overline{n}}$$

Accordingly, Z is

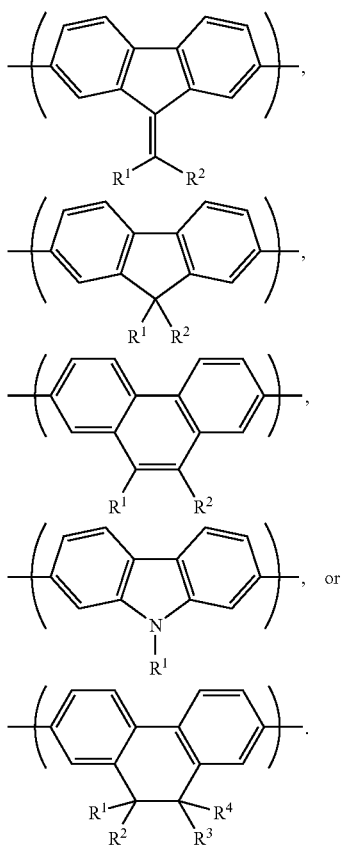

X is

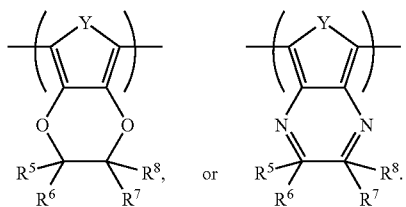

n is 2, 3, 4, 5, 6, 7, 8, 9, or 10.
Y is O, S, or

$R^1$, $R^2$, $R^3$, $R^4$, $R^5$, $R^6$, and $R^7$ can be the same or different, and each represents a hydrogen atom, a saturated or unsaturated alkyl group, an alkoxycarbonyl group, or an alkoxy group, wherein the saturated or unsaturated alkyl group, the alkoxycarbonyl group, or the alkoxy group is straight or branched and has 1 to 20 carbon atoms; and In addition, at least one hydrogen atom bonded to the carbon atom of the fluorescent oligomer according to formula (I) can be substituted optionally with a halogen atom.

In the present invention, the term "oligomer" refers to a compound having a repeating unit number which is an integer of 2 to 10.

In the present invention, the optical storage medium can be recorded and read using a blue laser light.

According to the present invention, the optical storage medium can further comprise a plurality of spacer layers, each formed between two adjacent recording layers. As well, the optical storage medium can also comprise a protective layer formed on the top recording layer. Fluorescent oligomer according to formula (I) used in the present invention is readily available at low costs and provides high quantum yield when compared with conventional materials used in 3D optical storage media, due to the advantages of easy preparation and special chemical configuration.

The present invention additionally provides a method for optical storage medium having three-dimensional data pattern, comprising the following steps.

First, a substrate is provided, comprising a first surface and a second surface opposite each other.

Next, a plurality of recording layers is formed on the first surface of the substrate, each comprises a fluorescent oligomer having the structure represented by formula (I):

Accordingly, Z is

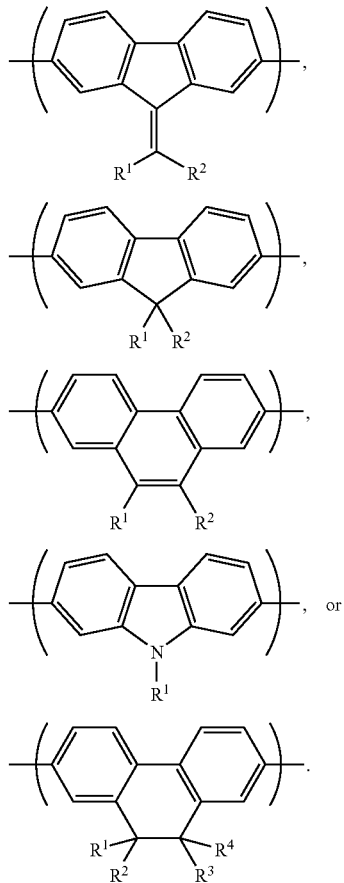

X is

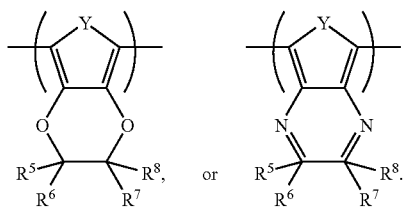

n is 2, 3, 4, 5, 6, 7, 8, 9, or 10.
Y is O, S, or

$R^1$, $R^2$, $R^3$, $R^4$, $R^5$, $R^6$, and $R^7$ can be the same or different, and each represents a hydrogen atom, a saturated or unsaturated alkyl group, an alkoxycarbonyl group, or an alkoxy group, wherein the saturated or unsaturated alkyl group, the alkoxycarbonyl group, or the alkoxy group is straight or branched and has 1 to 20 carbon atoms.

In addition, at least one hydrogen atom bonded to the carbon atom of the fluorescent oligomer according to formula (I) can be substituted optionally by a halogen atom.

In the present invention, the steps for forming the recording layer on the substrate are as follows.

A fluorescent oligomer according to formula (I) is provided to be dissolved in a solvent to yield a fluorescent oligomer solution.

Next, the fluorescent oligomer solution is coated on the substrate to form the recording layer, which is then subjected to a baking process.

According to the present invention, the method for fabricating an optical storage medium having a three-dimensional data pattern can further comprise forming spacer layers to separate adjacent recording layers. Furthermore, a protective layer can be formed on the top recording layer, after forming the recording layers and the spacer layers.

In order to understand the above and other objects, characteristics and advantages, the preferred embodiments and comparative embodiments of the present invention are now detailed described with reference to the accompanying drawings.

BRIEF DESCRIPTION OF THE DRAWINGS

The present invention is more fully understood by reading the subsequent detailed description and examples with references made to the accompanying drawings, wherein.

DETAILED DESCRIPTION OF THE INVENTION

Since the fluorescent oligomers according to formula (I) have a molecular weight from 500 to 4500 and a quantum yield of not less than 0.01Φ, the fluorescent oligomer is suitable for the optical storage medium of the present invention as a recording layer material. Moreover, due to the stock shift of not less than 50 nm thereof, the signal-to-noise (S/N) ratio of the optical storage medium is improved, thereby preventing crosstalk induced by reflective and excitative lights.

Figure 1:
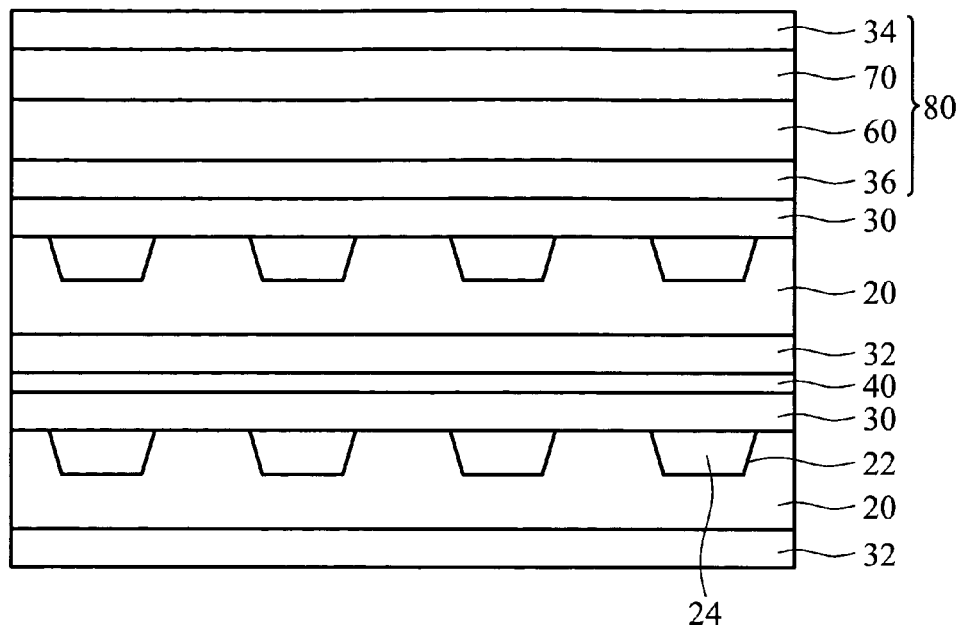
FIG. 1 is a cross section of a conventional 3D optical storage medium having a signal-amplifying structure.
Figure 2:
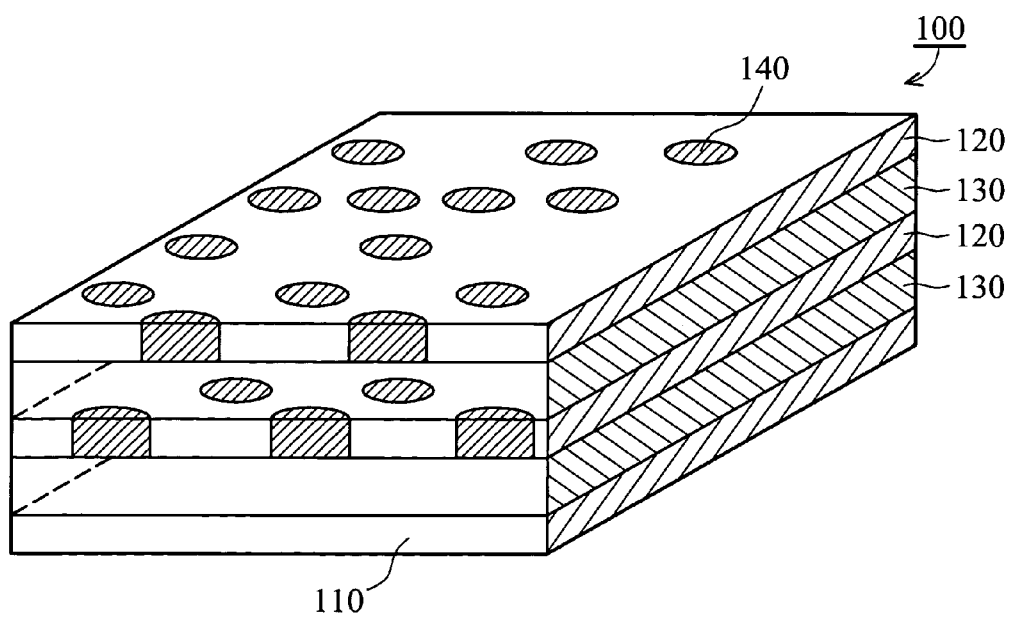
FIG. 2 is a schematic diagram of a conventional 3D optical storage medium employing a small molecular fluorescent material.
Figure 3:
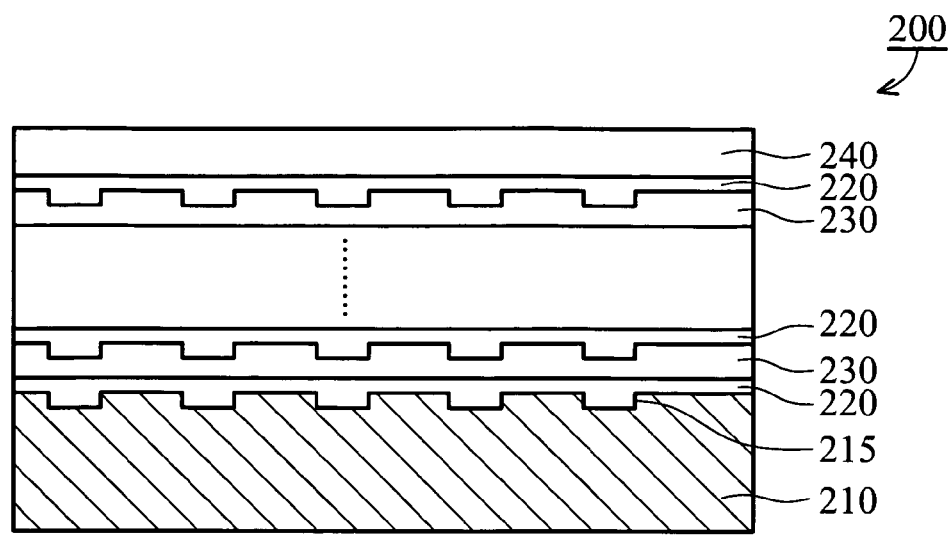
FIGS. 3 and 4 are cross sections of the optical storage media having three-dimensional data pattern according to the present invention.

The optical storage medium according to the present invention can embody a read-only disc or recordable disc, and can be read using a blue laser light. The method for fabricating optical storage media having three-dimensional data pattern, such as optical discs having three-dimensional data pattern, of the present invention is described in detail as below, referring to FIG. 3.

First, the fluorescent oligomer according to formula (I) is provided to be dissolved in an organic solvent to yield a fluorescent oligomer solution. The organic solvent dissolving the fluorescent oligomer can be alcohol, ketone, ether, halogen compound, or amide. The alcohol can have 1 to 6 carbon atoms, such as methanol, ethanol, isopropanol, diacetonalchol, 2,2,3,3-tetrafluoropropanol, trichloroethanol, 2-chloroethanol, octafluoropentanol, or hexafluorobutanol. The ketone can have 1 to 6 carbon atoms, such as acetone, methyl isobutyl ketone (MIBK), methyl ethyl ketone (MEK), or 3-hydroxy-3-methyl-2-butanone. The ether can be methylcyclohexane (MCH). The halogen compound can be chloroform, dichloromethane, or 1-chlorobutane. The amide can be dimethylformamide (DMF), or dimethylacetamide (DMA).

Next, the fluorescent oligomer solution is coated on a substrate 210 with a plurality of pits or grooves 205, and subjected to a baking process to form a recording layer 220. In the present invention, suitable material for the substrate 210 is a transparent insulating material, such as polyester (PE), polycarbonate (PC), or polymethylmthacrylate (PMMA). Additionally, the indolestyryl compound solution can be coated on the substrate 210 by spin coating, dip coating, embossing, stamping, thermal evaporation, or spray coating, with spin coating, at a speed of 500 to 5000rpm, being preferable. The recording layer has a thickness of about 50 nm to 300 nm, preferably 70 nm to 250 nm.

Next, a spacer layer 230, comprising a transparent adhesive or polymer material, is formed on the recording layer 220, wherein the spacer layer has a plurality of pits or grooves 205 formed therein.

Next, a plurality of recording layers 220 and spacer layers 230 are formed on the substrate 210 by repeating the steps mentioned for forming the recording layer 220 and the spacer layer 230, wherein two adjacent recording layers are separated by one spacer layer.

Figure 4:
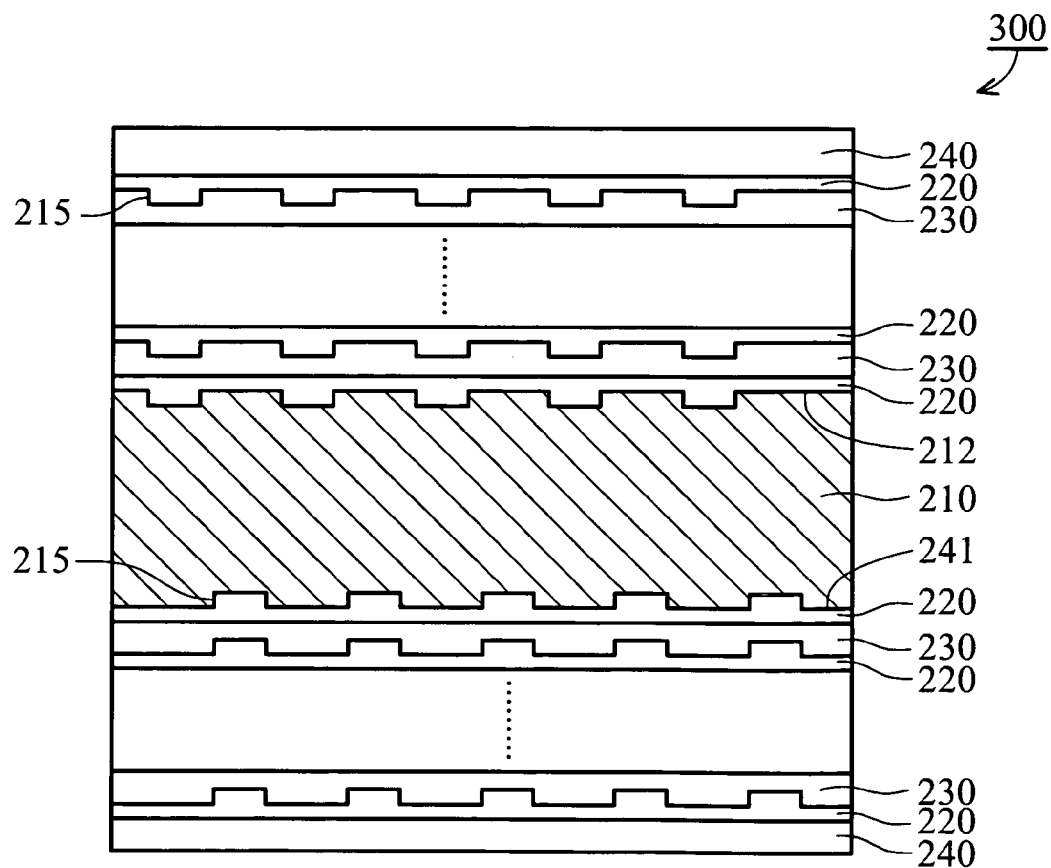

Finally, after forming the plurality of recording layers 220 and spacer layers 230, a protective layer is formed on the top recording layer, thus completing the fabrication of the optical discs having three-dimensional data pattern. Moreover, the reflective index of the substrate, the recording layer, the spacer layer, and the protective layer are essentially the same In the present invention, the optical storage medium can not only be a single-sided/multi-layer storage medium but also a dual-sided/multi-layer storage medium. For example, referring to FIG. 4, the optical storage medium of the present invention can be a dual-sided/multi-layer disc 300 comprising a plurality of recording layers 220 and spacer layers 230 on both sides of the substrate 210.

The following descriptions are intended to clarify the invention more fully without limiting the scope of the claims, since numerous modifications and variations will be apparent to those skilled in this art.

Preparation of Fluorescent Oligomers

The following discloses the compound structures, and symbols for the compounds in the embodiments of the present invention for better understanding.

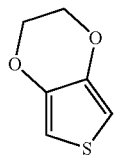

W1: 2,3-dihydrothieno[3,4-b]-1,4-dioxin

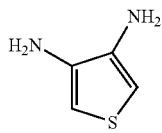

W2: 3,4-diaminothiophene dihydrobromide

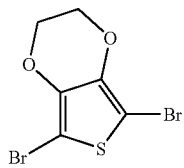

X1: 5,7-Dibromo-2,3-dihydro-thieno[3,4-b][1,4]dioxine

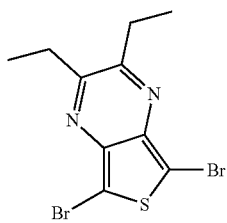

X2: 5,7-Dibromo-2,3-diethyl-thieno[3,4-b]pyrazine

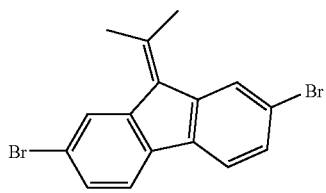

Y1: 2,7-Dibromo-9-isopropylidene-9H-fluorene

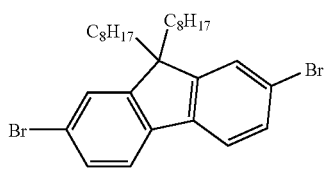

Y2: 9,9'-dioctyl-2,7-dibromofluorene

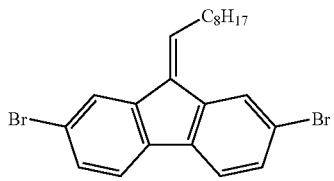

Y3: 2,7-Dibromo-9-nonylidene-9H-fluorene

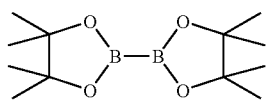

Y4: bis(pinacolate)diboron

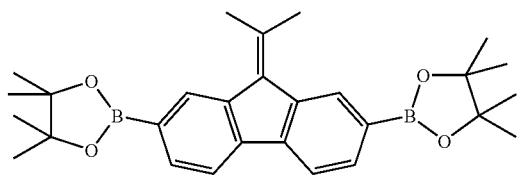

Z1: 9-isoproylidene-9H-fluorene-2,7-di(ethyleneboronate)

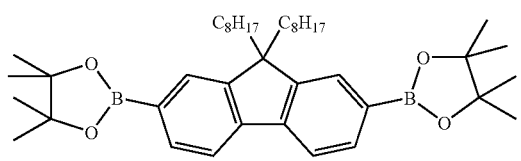

Z2: 9,9'-di-n-octylfluorene-2,7-di(ethyleneboronate)

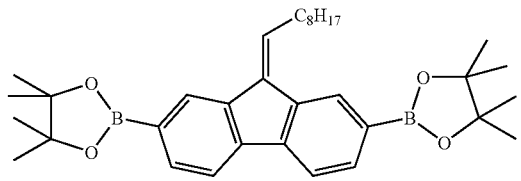

Z3: 9-nonylidene-9H-fluorene-2,7-di(ethyleneboronate)

Preparation 1

X1 Synthesis:

In a nitrogen atmosphere, 40 ml of acetic anhydride, 4.0 g of W1 and 3.1 ml of bromine were added into a round-bottom flask and cooled to 0° C. After mixing completely for 30 minutes, the resulting mixture was subjected to extraction with a mixed solvent (H2O:ethyl acetate=1:1) 200 ml, dried over anhydrous MgSO$_4$, filtered, and condensed, yielding X1 as a gold solid with a chemical purity 91.31% in a 95.2% yield. The reaction according to Preparation 1 is shown below.

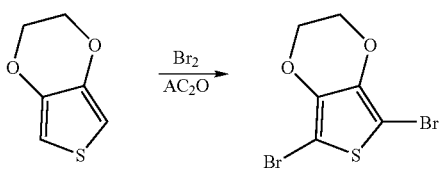

Preparation 2

X2 Synthesis:

In a nitrogen atmosphere, 40 ml of ethanol, 2.0 g (7.2 mmol) of W2 and 2.58 ml (14.4 mmol) of n-bromosuccinimide (NBS) were added into a round-bottom flask and cooled to 0° C. After mixing completely for 15 minutes, 1.74 g (14.4 mmol) of anhydrous $MgSO_4$ and 0.74 g (6.5mmol) of 3,4-hexanedione were added to the round-bottom flask and stirred for 1 hour. After complete reaction, the resulting mixture was subjected to extraction with $H_2O$ and ethyl acrylate, dried over anhydrous $MgSO_4$, filtered, and condensed, yielding X2 as a black solid with a chemical purity 71% in a 31.1% yield. The reaction according to Preparation 2 is shown below.

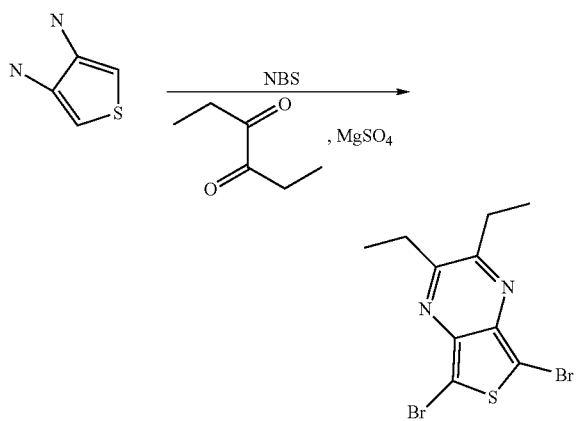

Preparation 3

Z1 Synthesis:

In a nitrogen atmosphere, 40 ml of tetrahydrofuran (THF), 2.0 g (5.74mmol) of Y1, 2.97 ml (11.7mmol) of Y4, 2.15 g (21.9mmol) of potassium acetate, and 0.045 g (5.47×10⁻2mmol) of $Pd(dppf)Cl_2CH_2Cl_2$ were added into a round-bottom flask and heated to 60° C. After mixing completely for 120 hours, the resulting mixture was subjected to extraction 10 with a mixed solvent ($H_2O$:toluene=1:1), dried over anhydrous $MgSO_4$, filtered, decolorized with active carbon, and recrystallized from 100 ml isopropanol (IPA), yielding Z1 as a yellow solid in a 41% yield. The reaction according to Preparation 3 is shown below.

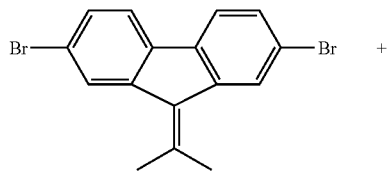

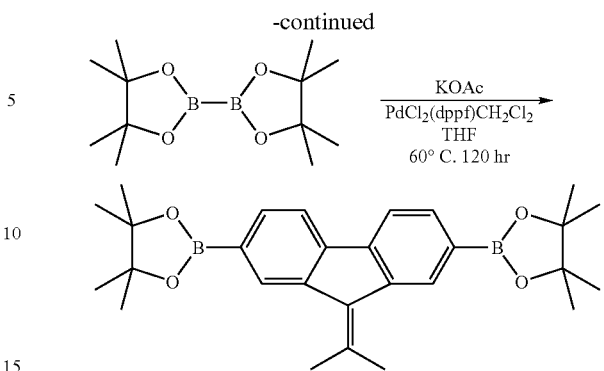

Preparation 4

Z2 Synthesis:

In a nitrogen atmosphere, 20 ml of toluene, 3.0 g (5.47mmol) of Y2, 2.97 ml (11.7mmol) of Y4, 2.15 g (21.9mmol) of potassium acetate, and 0.045 g (0.054mmol) of $Pd(dppf)Cl_2CH_2Cl_2$ were added into a round-bottom flask and heated to 60° C. After mixing completely for 120 hours, the resulting mixture was subjected to extraction with a mixed solvent ($H_2O$:toluene=1:1), dried over anhydrous $MgSO_4$, filtered, decolorized with active carbon, and recrystallized from 100 ml isopropanol (IPA), yielding Z2 as a white solid in a 75% yield. The reaction according to Preparation 4 is shown below.

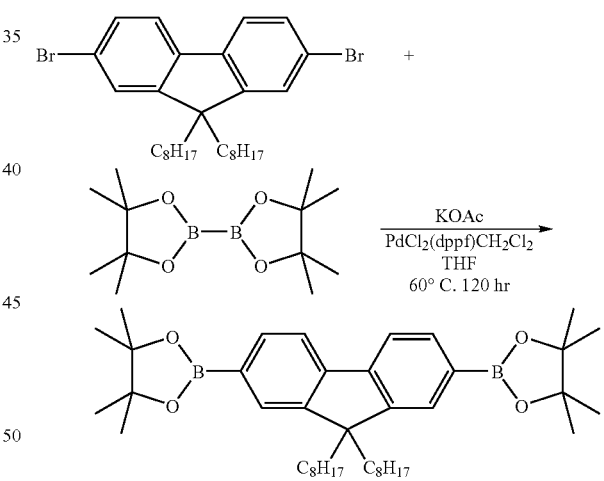

Preparation 5

Z3 Synthesis:

In a nitrogen atmosphere, 20 ml of toluene, 2 ml of methanol, 2.0 g (4.46mmol) of Y3, 1.94 ml (7.64mmol) of Y4, 2.15 g (21.9mmol) of potassium acetate, and 0.045 g (5.47×10⁻²mmol) of $Pd(dppf)Cl_2CH_2Cl_2$ were added into a round-bottom flask and heated to 60° C. After mixing completely for 8 hours, the resulting mixture was subjected to extraction with a mixed solvent ($H_2O$:ethyl acetate=1:1), dried over anhydrous $MgSO_4$, filtered, and condensed, yielding Z3 as a white solid in a 70% yield. The reaction according to Preparation 5 is shown below.

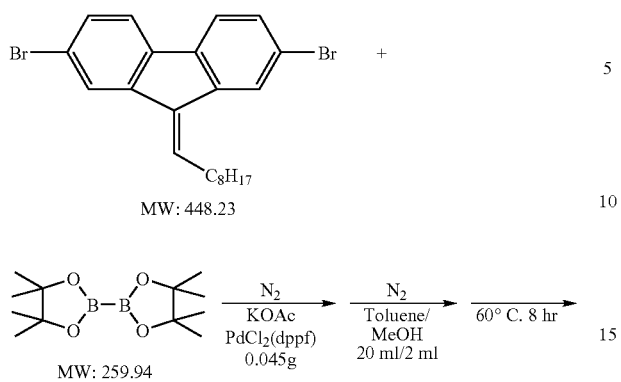

EXAMPLE 1

Fluorescent Oligomer (1) Synthesis:

In a nitrogen atmosphere, 26 ml of toluene, 0.5 g (0.74mmol) of Z2, 0.233 ml (0.74mmol) of X1, 0.02 g (0.017mmol) of Pd(PPh$_3$)$_4$, and 2 ml of Et$_4$NOH (dissolved in methanol) were added into a round-bottom flask and heated to 115° C. After mixing completely for 3 hours, the resulting mixture was subjected to extraction with a mixed solvent (toluene:methanol:H$_2$O=10:10:1), dried over anhydrous MgSO$_4$, filtered, and recrystallized from methanol, yielding Fluorescent oligomer (1) as an orange powder with average molecular weight of 2500 by gel permeation chromatography (GPC) analysis. The reaction according to Example 1 is shown below.

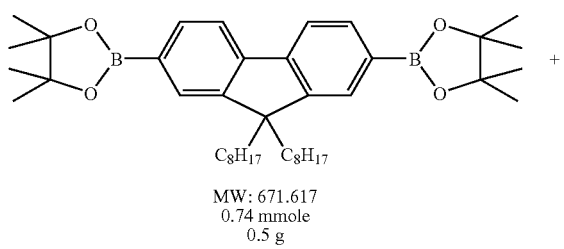

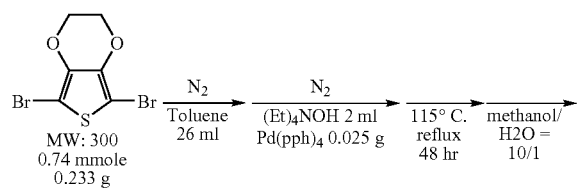

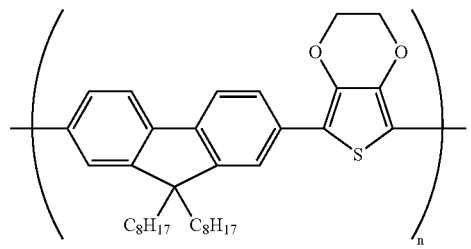

EXAMPLE 2

Fluorescent Oligomer (2) Synthesis:

In a nitrogen atmosphere, 26 ml of toluene, 0.34 g (0.74mmol) of Z1, 0.233 ml (0.74mmol) of X1, 0.02 g (0.017mmol) of Pd(PPh$_3$)$_4$, and 2 ml of Et$_4$NOH (dissolved in methanol) were added into a round-bottom flask and heated to 115° C. After mixing completely for 3 hours, the resulting mixture was subjected to extraction with a mixed solvent (toluene:methanol:H$_2$O=10:10:1), dried over anhydrous MgSO$_4$, filtered, and recrystallized from methanol, yielding Fluorescent oligomer (1) as a yellow powder. The reaction according to Example 2 is shown below.

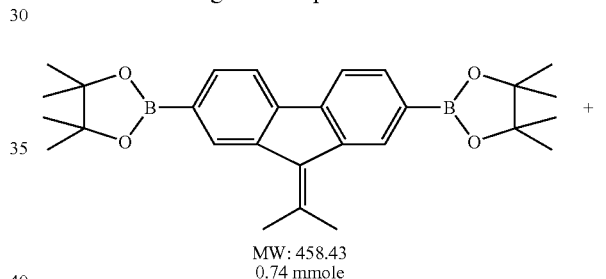

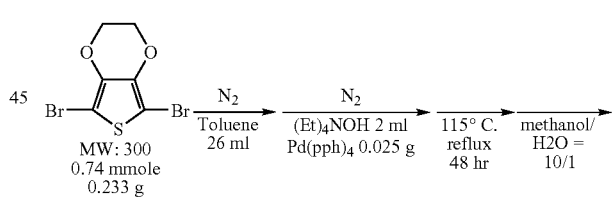

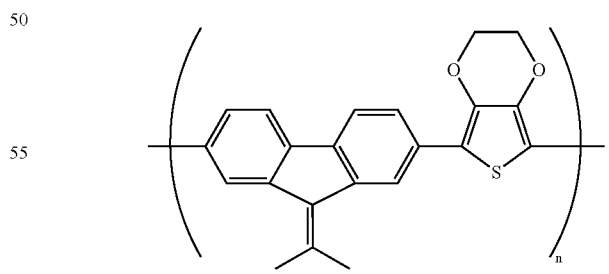

EXAMPLE 3

Fluorescent Oligomer (3) Synthesis:

In a nitrogen atmosphere, 26 ml of toluene, 0.4 g (0.74mmol) of Z3, 0.233 ml (0.74mmol) of X1, 0.02 g (0.017mmol) of Pd(PPh$_3$)$_4$, and 2 ml of Et$_4$NOH (dissolved in methanol) were added into a round-bottom flask and heated to 115° C. After mixing completely for 3 hours, the resulting mixture was subjected to extraction with a mixed solvent (toluene:methanol:H$_2$O=10:10:1), dried over anhydrous MgSO$_4$, filtered, and recrystallized from methanol, yielding Fluorescent oligomer (1) as a black solid with average molecular weight of 2297 by gel permeation chromatography (GPC) analysis. The reaction according to Example 3 is shown below.

heated to 115° C. After mixing completely for 3 hours, the resulting mixture was subjected to extraction with a mixed solvent (toluene:methanol:H$_2$O=10:9:1), dried over anhydrous MgSO$_4$, filtered, and recrystallized from methanol, yielding Fluorescent oligomer (1) as a black colloid with average molecular weight of 912 by gel permeation chromatography (GPC) analysis. The reaction according to Example 4 is shown below.

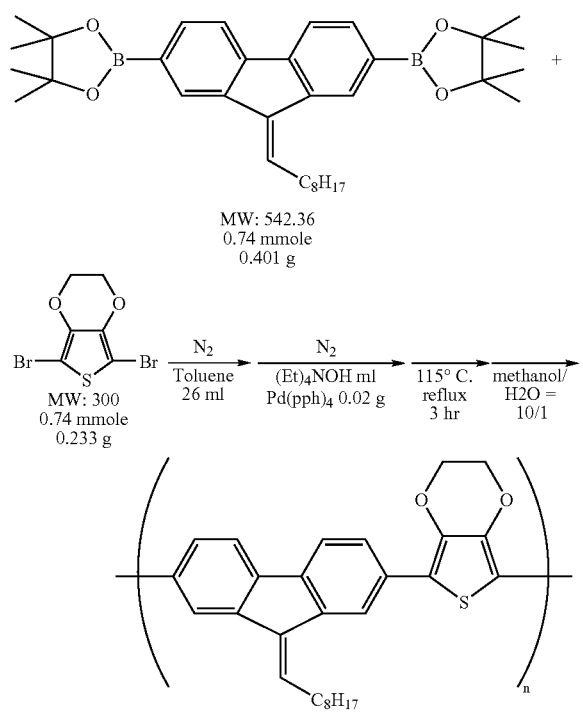

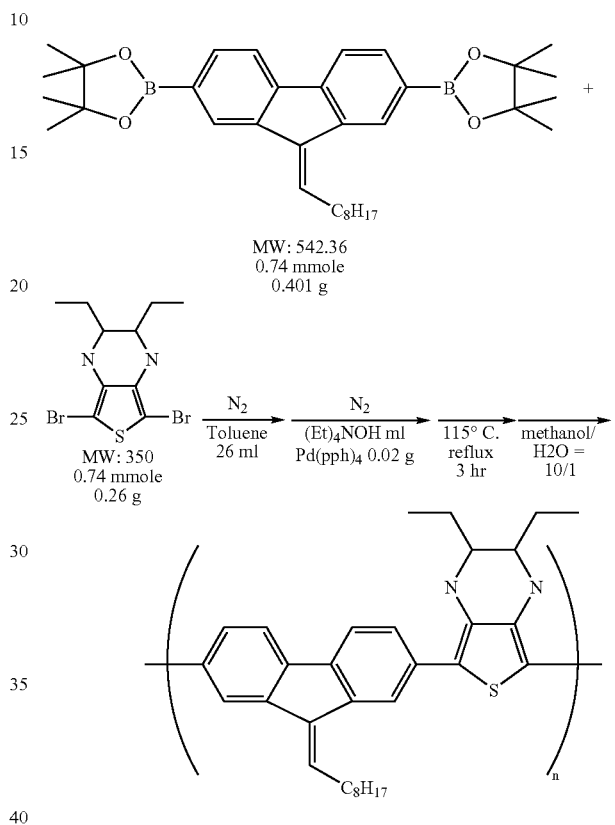

EXAMPLE 4

Fluorescent Oligomer (4) Synthesis:

In a nitrogen atmosphere, 26 ml of toluene, 0.4 g (0.74mmol) of Z3, 0.26 ml (0.74mmol) of X2, 0.02 g (0.017mmol) of Pd(PPh$_3$)$_4$, and 2 ml of Et$_4$NOH (dissolved in methanol) were added into a round-bottom flask and The chemical structure, repeating unit number, quantum yield, and stock shift of the Fluorescent oligomers (1) to (4) respectively provided by Example 1 to 4 are shown in Table 1. Moreover, the quantum yield, and stock shift of conventional small molecular fluorescent materials are also shown in Table 1, in order to demonstrate the advantages of the fluorescent oligomers employed in the present invention.

TABLE 1

| Fluorescent oligomers according to the present invention | | | | |
|---|---|---|---|---|
| | Chemical structure | repeating unit number | quantum yield ($\Phi$) | stock shift (nm) |
| Fluorescent oligomer (1) | [structure] | n = 4~6 | 0.55 | 100 |

TABLE 1-continued

| | Structure | | quantum yield (Φ) | stock shift (nm) |
|---|---|---|---|---|
| Fluorescent oligomer (2) | [fluorene-thiophene-dioxine copolymer structure] | n = 4~6 | 0.076 | 111 |
| Fluorescent oligomer (3) | [fluorene with C₈H₁₇ vinyl – thiophene-dioxine copolymer] | n = 4~6 | 0.13 | 63 |
| Fluorescent oligomer (4) | [fluorene with C₈H₁₇ vinyl – thienopyrazine copolymer] | n = 2~3 | 0.022 | 217 |

Conventional small molecular fluorescent materials

| | Chemical structure | quantum yield (Φ) | stock shift (nm) |
|---|---|---|---|
| Acridine | [acridine·HCl with dimethylamino groups] | <0.01 | 26 |
| Rhodamine | [rhodamine structure with $CO_2R$] | <0.01 | 22 |
| Cyamine | [cyanine dye structure] | 0.028 | 40 |
| Phenoxazine | [phenoxazine structure] | <0.01 | 19 |

R: alkyl group

Accordingly, the fluorescent oligomer according to formula (I) for use as recording layer material has a quantum yield of more than 0.01Φ, preferably more than 0.1Φ. In comparison with conventional small molecular fluorescent materials, the quantum yield of the fluorescent oligomer according to formula (I) is from 10 to 20 times larger than that of small molecular fluorescent materials, improving the sensitivity of the optical storage medium. Moreover, since the stock shift of the fluorescent oligomer exceeds 50 nm, preferably more than 100 nm, the signal-to-noise (S/N) ratio of the optical storage medium is increased, preventing crosstalk induced by reflective and excitative lights. Furthermore, a film of fluorescent oligomer according to formula (I) can be formed by dissolved the fluorescent oligomer directly into an organic solvent and coating the obtained solution thereof on a substrate, without oncentration quenching effect.

Fabrication of Optical Disco Having Three-Dimensional Data Pattern

EXAMPLE 5

First, 1.8 g of Fluorescent oligomer (1) was dissolved in 2,2,3,3-tetrafluoropropanol to prepare a 100 g solution thereof.

The mentioned solution was coated on a polycarbonate (PC) substrate having a plurality of lands and grooves, by spin coating comprising a coating process and a swinging process, and subjected to a baking process to form a first recording layer. Herein, the coating process had a speed of 30 to 500rpm for 2 to 10 seconds, the swinging process a speed of 1000 to 3000rpm for 10 to 20 seconds, and the baking process a speed of 3000 to 5000rpm for 10 to 20 seconds.

Next, a first spacer layer having a plurality of lands and grooves was formed on the first recording layer. Next, a second recording layer and a second spacer layer were formed respectively on the first spacer layer by repeating the mentioned steps for forming the first recording layer and spacer layer.

Finally, a polycarbonate (PC) layer serving as a protective layer was formed on the second recording layer, resulting in an optical disc having three-dimensional data pattern.

Accordingly, the optical storage medium according employing fluorescent oligomers as recording layer materials exhibit high recording sensitivity, absorption coefficient, and storage capacity, due to the high quantum yield and high stock shift of the fluorescent oligomers.

Moreover, the fluorescent oligomer according to formula (I) can be dissolved in an organic solvent, such as alcohol, ketone, ether, halogen compound, or amide, and serve as a recording layer material in fabrication of optical storage media through a simple coating method, such as spray, roller, dip, or spin coating, resulting in simple fabrication process and low cost.

Accordingly, the fluorescent oligomer according to the present invention exhibits strong absorbance in the visible light region of the spectrum, and high absorption coefficient. Particularly, the R1 aryl side group of the fluorescent oligomer further assists in improved resistance to heat and light, and the solubility thereof. Therefore, the fluorescent oligomer can be dissolved in an organic solvent, such as alcohol, ketone, ether, halogen compound, or amide, and serve as a recording layer material in the fabrication high-density recording media with high recording sensitivity, reflective index, and CNR value through a simple coating method, such as spray, roller, dip, or spin coating.

Moreover, due to the advantages of easy preparation and simple purification, the fluorescent oligomer according to the present invention is readily available at low costs and provides high quantum yield when compared with conventional recording layer materials used in optic storage discs.

While the invention has been described by way of example and in terms of the preferred examples, it is to be understood that the invention is not limited to the disclosed examples. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical storage medium comprising a three-dimensional data pattern, comprising:

a substrate with a first surface; and a plurality of recording layers formed on the first surface, wherein the recording layer comprises a fluorescent oligomer having a formula (I), of:

$(-Z-X-)_n$ wherein

Z is

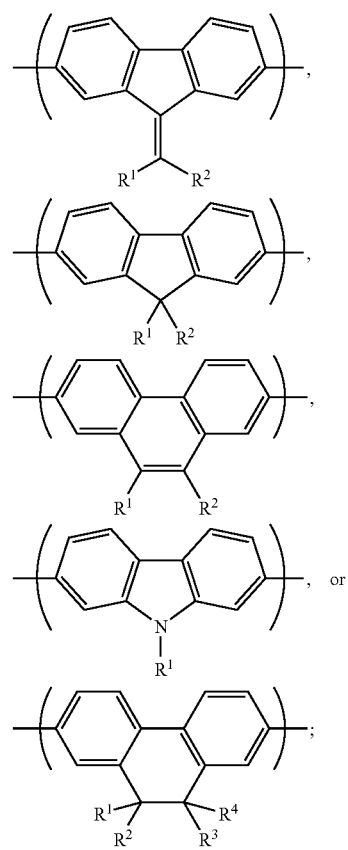

X is

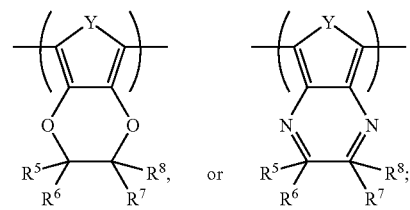

n is 2, 3, 4, 5, 6, 7, 8, 9, or 10;

Y is O, S, or

$R^1, R^2, R^3, R^4, R^5, R^6$ and $R^7$ are the same or different, and each denotes a hydrogen atom, a saturated or unsaturated alkyl group, an alkoxycarbonyl group, or an alkoxy group, wherein the saturated or unsaturated alkyl group, the alkoxycarbonyl group, or the alkoxy group is straight or branched and has 1 to 20 carbon atoms; and at least one hydrogen atom bonded to the carbon atom of the fluorescent oligomer according to formula (I) is substituted optionally with a halogen atom.

2. The optical storage medium as claimed in claim 1, wherein the adjacent recording layers are separated by a spacer layer.

3. The optical storage medium as claimed in claim 2, wherein the spacer layer comprises a transparent adhesive or polymer material.

4. The optical storage medium as claimed in claim 1, further comprising a protective layer formed on the top recording layer.

5. The optical storage medium as claimed in claim 4, wherein the reflective indexes of the substrate, the recording layer, the spacer layer, and the protective layer are essentially the same.

6. The optical storage medium as claimed in claim 1, wherein the recording layer comprises a plurality of pits filled by the fluorescent oligomer.

7. The optical storage medium as claimed in claim 1, wherein the fluorescent oligomer has a stock shift of not less than 50 nm.

8. The optical storage medium as claimed in claim 1, wherein the fluorescent oligomer has a molecular weight from 500 to 4500.

9. The optical storage medium as claimed in claim 1, wherein the fluorescent oligomer has a quantum yield of not less than $0.02\Phi$.

10. The optical storage medium as claimed in claim 1, wherein the fluorescent oligomer has a quantum yield of not less than $0.1\Phi$.

11. The optical storage medium as claimed in claim 1, wherein n is 3, 4, 5, or 6.

12. The optical storage medium as claimed in claim 1, wherein the substrate has a second surface opposite the first surface and the recording layers are formed on the first surface and the second surface.

13. The optical storage medium as claimed in claim 1, wherein the optical storage medium is a read-only disc.

14. The optical storage medium as claimed in claim 1, wherein the optical storage medium is a recordable disc.

15. The optical storage medium as claimed in claim 1, wherein the optical storage medium is recorded and read using a blue laser light.

16. A method for fabricating an optical storage medium comprising a three-dimensional data pattern, comprising the following steps:

providing a substrate comprising a first surface and a second surface opposite each other;

forming a plurality of recording layers on the first surface of the substrate, wherein the recording layer comprises a fluorescent oligomer having a formula (I), of:

$(-Z-X-)_n$ wherein
Z is

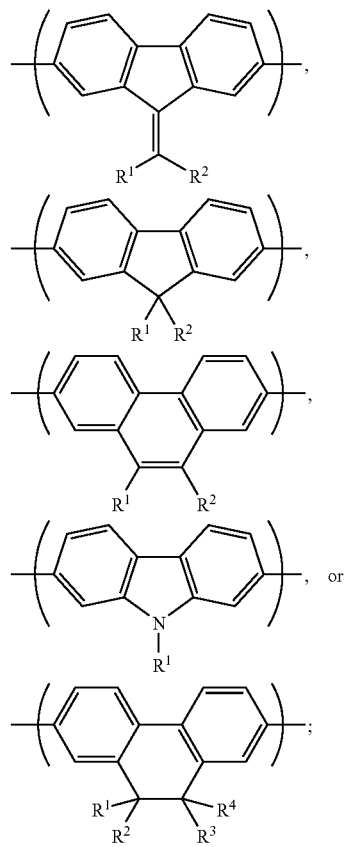

X is

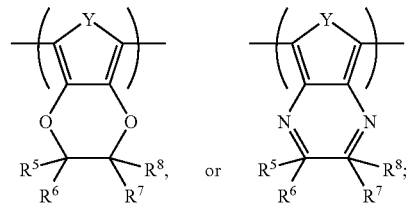

n is 2, 3, 4, 5, 6, 7, 8, 9, or 10;

Y is O, S, or

$R^1, R^2, R^3, R^4, R^5, R^6$ and $R^7$ are the same or different, and each represents a hydrogen atom, a saturated or unsaturated alkyl group, an alkoxycarbonyl group, or an alkoxy group, wherein the saturated or unsaturated alkyl group, the alkoxycarbonyl group, or the alkoxy group is straight or branched and has 1 to 20 carbon atoms; and at least one hydrogen atom bonded to the carbon atom of the fluorescent oligomer according to formula (I) is substituted optionally by a halogen atom.

17. The method as claimed in claim 16, further comprising forming spacer layers to separate the adjacent recording layers.

18. The method as claimed in claim 17, further comprising, after forming the recording layers and the spacer layers, forming a protective layer on the top recording layer.

19. The method as claimed in claim 18, wherein the reflective indexes of the substrate, the recording layer, the spacer layer, and the protective layer are essentially the same.

20. The method as claimed in claim 16, wherein the recording layer comprises a plurality of pits filled by the fluorescent oligomer.

21. The method as claimed in claim 16, wherein the fluorescent oligomer has a stock shift of not less than 50 nm.

22. The method as claimed in claim 16, wherein the fluorescent oligomer has a molecular weight from 500 to 4500.

23. The method as claimed in claim 16, wherein the fluorescent oligomer has a quantum yield of not less than $0.02\Phi$.

24. The method as claimed in claim 16, wherein the fluorescent oligomer has a quantum yield of not less than $0.1\Phi$.

25. The method as claimed in claim 16, wherein n is 3, 4, 5, or 6.

26. The method as claimed in claim 16, wherein the optical storage medium is recorded and read using a blue laser light.

27. The method as claimed in claim 16, wherein the optical storage medium is a read-only disc.

28. The method as claimed in claim 16, wherein the optical storage medium is a recordable disc.

* * * * *